United States Patent [19]

Pryor et al.

[11] Patent Number: 5,711,184
[45] Date of Patent: Jan. 27, 1998

[54] GIMBALLED DRIVE BLOCK FOR VEHICLE SEAT ADJUSTER

[75] Inventors: Thomas E. Pryor, Chelsea; Joseph C. Montano, Troy, both of Mich.

[73] Assignee: Lear Corporation, Southfield, Mich.

[21] Appl. No.: 552,878

[22] Filed: Nov. 3, 1995

[51] Int. Cl.⁶ .................................................. F16H 27/02
[52] U.S. Cl. .................... 74/89.15; 74/89; 74/424.8 R; 248/429
[58] Field of Search ................ 74/89, 89.15, 424.8 R; 248/429

[56] References Cited

U.S. PATENT DOCUMENTS

| | | |
|---|---|---|
| 2,929,439 | 3/1960 | Tanaka et al. . |
| 3,043,552 | 7/1962 | Colautti . |
| 3,617,021 | 11/1971 | Littmann . |
| 4,015,812 | 4/1977 | Heesch . |
| 4,274,293 | 6/1981 | Ruger . |
| 4,432,583 | 2/1984 | Russo et al. . |
| 4,794,810 | 1/1989 | Parsons ........................ 74/424.8 R |
| 4,802,374 | 2/1989 | Hamelin et al. . |
| 4,949,585 | 8/1990 | Dauvegne et al. . |
| 5,014,958 | 5/1991 | Harney . |
| 5,048,786 | 9/1991 | Tanaka et al. ...................... 248/429 |
| 5,125,611 | 6/1992 | Cox ............................... 248/429 |
| 5,172,601 | 12/1992 | Siegrist et al. . |
| 5,207,473 | 5/1993 | Nawa et al. . |
| 5,224,749 | 7/1993 | Gauger ........................... 248/429 |
| 5,292,164 | 3/1994 | Rees ............................. 248/429 |
| 5,445,354 | 8/1995 | Gauger et al. . |
| 5,456,439 | 10/1995 | Gauger . |
| 5,473,958 | 12/1995 | Jeck et al. . |
| 5,575,449 | 11/1996 | Shinbori ......................... 248/429 |

FOREIGN PATENT DOCUMENTS

| | | |
|---|---|---|
| 0317381 | 5/1989 | European Pat. Off. . |
| 3724038 | 2/1989 | Germany . |
| 4119610 | 12/1992 | Germany . |
| 2260898 | 5/1993 | United Kingdom . |

Primary Examiner—Charles A. Marmor
Assistant Examiner—David M. Fenstermacher
Attorney, Agent, or Firm—Young & Basile, PC

[57] ABSTRACT

A drive apparatus suitable for a power seat adjuster includes a rotatable lead screw disposed between an upper track movably mounted with respect to a stationary lower track. A drive block is rotatably mounted in the lower track for rotation about an axis extending perpendicular to the lower track. A first bore extends through the drive block for receiving the lead screw carried on the upper track. An insert body is movably mounted in a second bore in the drive block, the second bore extending transversely to and intersecting the first bore. A transverse, threaded third bore formed in the insert body threadingly engages the lead screw. The first bore has a larger diameter than the diameter of the lead screw to permit pivotal movement of the insert body and the lead screw about an axis extending through the second bore. The first bore also has a larger diameter than the third bore in the insert body to permit lateral movement of the insert body within the drive block while maintaining a first bore and the third bore in the insert body in communication.

22 Claims, 2 Drawing Sheets

GIMBALLED DRIVE BLOCK FOR VEHICLE SEAT ADJUSTER

BACKGROUND OF THE INVENTION

1. Field of the Invention

The present invention relates, in general, to vehicle seat adjusters.

2. Description of the Art

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes a electric motor which hi-directionally rotates a pair of drive shafts extending outward from the motor to a gear assembly or box mounted on each upper track. In one arrangement, each gear box rotates a lead screw extending longitudinally below and carried by each upper track. A drive block is fixedly mounted to each lower track and threadingly receives the lead screw to cause reciprocal, horizontal movement of the upper track and the attached seat support frame relative to the lower track which is fixed to the vehicle upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge seat adjustment drive mechanisms for selectively tilting the front and rear edges of the seat bottom independent of each other as well as simultaneously to raise and lower the entire vehicle seat or, in some applications, only the seat bottom or cushion.

However, the rigid connection between the gears in the gear assembly, the drive motor output shaft, the drive shaft, the lead screw and the drive block frequently leads to problems during assembly and operation of a vehicle power seat adjuster. It is inevitable in the manufacture and assembly of a mechanical mechanism, such as a power seat adjuster, that poor dimensional conditions, such as concentricity, TIR, and linear discrepancies from nominal design dimensions, can and typically do occur. These dimensional conditions, without correction, can cause various problems in the operation of a power seat adjuster, such as poor breakaway from a stop position, slow operation of the power seat adjuster in extreme temperatures, excessive wear of the components of the power seat adjuster, uneven operation of the power seat adjuster, and the generation of unpleasant sounds or noise during the operation of the power seat adjuster.

To address these problems, power seat adjusters have been devised in which the drive block is rotatably mounted in a aperture in the lower track for rotation about an axis extending longitudinally through the drive block and perpendicular to the lower track. Such rotation of the drive block is achieved by freely mounting the drive block in the aperture in the lower track without any additional fasteners, or by using a fastener with an enlarged head. In this latter structure, a cylindrical mounting collar or boss extends from the drive block through the aperture in the lower track and receives the fastener in an internal threaded bore. The mounting collar has a length than the thickness of the lower track to provide a small amount of vertical play between the drive block and the lower track to permit rotation of the drive block in the aperture in the lower track.

Both of these types of rotatable drive blocks accommodate variations in end-to-end alignment of the lead screw and the lower track.

It is also known to provide other drive blocks or bearing blocks used in a power seat adjuster to connect the drive shaft to a lead screw and/or to connect the lead screw to a seat block recliner linkage with freedom of movement about two mutually exclusive axes. In this structure, the drive block or bearing block is provided with a pair of outwardly extending legs which ride in slots in a support bracket to enable rotation of the drive or bearing block about an axis extending through the legs. The side walls of the bracket carrying the slots is also formed slightly wider than the drive or bearing block to provide a small amount of lateral translation of the drive or bearing block in the bracket.

However, heretofore, a drive block has not been provided with adjustable movement in their mutually exclusive directions or axes to accommodate all alignment positions of a lead screw relative to a lower track of a vehicle seat adjuster.

Thus, it would be desirable to provide a vehicle seat adjuster which having a unique drive block which enables the drive block to conform to all alignment positions of a lead screw relative to a lower track or other component of a vehicle seat adjuster. It would also be desirable to provide such a drive block which does not require modification of the other seat adjuster components. It would also be desirable to provide a unique drive block which accommodates all alignment positions of the lead screw to enable slow speed and high torque rotation of the lead screw without objectionable noise.

SUMMARY OF THE INVENTION

The present invention is a drive apparatus which is advantageously employable in a vehicle seat adjuster.

The drive apparatus includes first and second members, the first member being movable relative to the second member. A threaded shaft is carried with the first member. Means are coupled to the threaded shaft for imparting rotation to the shaft. A drive block is carried with the second member. Means, coacting with the drive block, are provided for allowing pivotal movement of the threaded shaft relative to the drive block about two perpendicular axes, each of the two axes disposed mutually exclusively perpendicular to the axis of rotation of the threaded shaft.

The coacting means preferably includes means, carried with the drive block and threadingly engaging the threaded shaft extending through the first aperture means in the drive block, for causing linear movement of the threaded shaft and the first member relative to the drive block and the second member as the threaded shaft is rotated. Such means is rotatable about an axis perpendicular to the axis of rotation of the threaded shaft.

The coacting means also includes means, carried on the drive block and formed in the second member, for substantially axially fixedly mounting the drive block to the second member and for allowing rotation of the drive block about a longitudinal axis extending through the drive block substantially perpendicular to the second member. Such means includes an aperture formed in the second member. A mounting collar formed on the drive block is mountable in the aperture in the second member. The aperture and the mounting collar each have a circular cross section, with a diameter of the aperture being larger than an outer diameter of the mounting collar.

Fastening means, engagable with the drive block, is provided for mounting the drive block on the second member. The mounting collar on the drive block has a greater thickness than a thickness of the second member to enable movement of the drive block with respect to the second member when the drive block is coupled to the second member by the fastening means.

Preferably, a first aperture or bore is formed in the drive block for receiving the threaded shaft. Further, a second bore is formed in the drive block perpendicular to and intersecting the first aperture and movably receives an insert body. A threaded third bore is formed in the insert body perpendicular to the first aperture and threadingly engaging the threaded shaft. The insert body is rotatable about an axis perpendicular to the axis of rotation of the lead screw to permit angular repositioning of the lead screw with respect to the drive block and the second member about said axis. The first aperture is, in one embodiment, a first bore extending through the drive block and having an inner diameter greater than the outer diameter of the threaded shaft to accommodate such angular repositioning of the threaded shaft.

The diameter of the first bore is also greater than the diameter of the third bore to enable lateral movement of the body in the first bore while maintaining the first and third bores in communication. Enlarged end flanges are formed on the insert body to retain the insert body in the drive block while allowing such lateral movement.

The drive apparatus is ideally suited for use in a vehicle seat adjuster assembly wherein the first and second members are the upper and lower tracks of one of the seat adjuster track assemblies. The threaded shaft is in the form of a lead screw disposed between the upper and lower tracks and carried with the upper track.

The unique drive block of the present invention accommodates any positional arrangement of the lead screw with respect to the lower track and overcomes any dimensional problems, such as concentricity, TIR, and linear discrepancies from nominal dimensions of the components of the seat adjuster. This enables the lead screw, despite its variable positional arrangement with respect to the lower track, to be rotated at the desired low speed with high torque without objectionable noise, interference or wear.

BRIEF DESCRIPTION OF THE DRAWING

The various features, advantages and other uses of the present invention will become more apparent by referring to the following detailed description and drawing in which:

FIG. 5 is a side elevational view of the assembled drive block and insert; and

DESCRIPTION OF THE PREFERRED EMBODIMENTS

Figure 1:
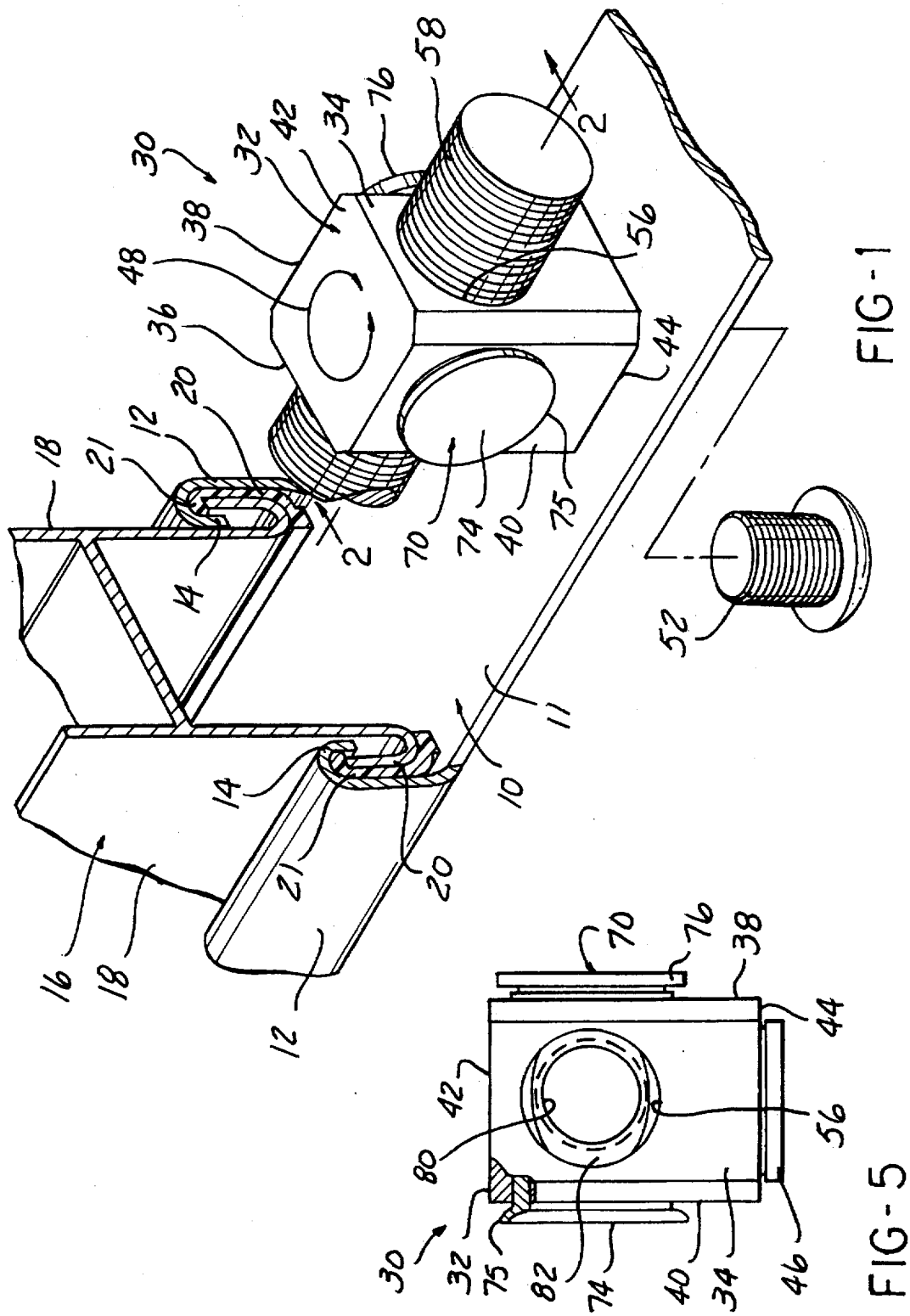
FIG. 1 is a partial, perspective view of one track assembly of a vehicle seat adjuster employing a drive block constructed in accordance with the teachings of the present invention.

Referring now to the drawing, and to FIGS. 1–5 in particular, there is depicted a gimballed drive block which is advantageously used in a vehicle seat adjuster, and, particularly, a vehicle power seat adjuster. The drive block couples a rotatable shaft or lead screw to one stationary component, such as the lower track of the vehicle seat adjuster to effect movement of another component, such as an upper track, relative to the stationary component or lower track upon rotation of the shaft or lead screw.

As the construction and operation of a vehicle seat adjuster, and, more particularly, a vehicle power seat adjuster, is well known, a detailed illustration and description of the structure and operation of such a vehicle seat adjuster will not be provided herein. A complete description of a vehicle power seat adjuster can be had by referring to U.S. Pat. No. 5,456,439, the contents of which are incorporated herein by reference. However, a brief description of a conventional power seat adjuster will be generally provided in order to clearly understand and appreciate the features and advantages afforded by the gimballed drive block of the present invention.

As is conventional, a power seat adjuster supports a conventional vehicle seat which includes a seat bottom or cushion and a seat back. An upper seat support frame is provided on the power seat adjuster for supporting the seat bottom and the seat back on the upper track. The upper seat support frame includes a pair of spaced, longitudinally extending frame members or rails. Mounting brackets or surfaces are mounted on the front end and the rear end of the frame members to connect the seat bottom to the upper seat support frame. A pair of seat back pivot brackets are mounted on each of the seat support frame members and provide a pivot connection to the seat back, not shown, to permit selective tilting or pivotal movement of the seat back with respect to the seat bottom as is typical in so-called "seat recliners".

Various drive assemblies are mounted on the power seat adjuster to provide selective movement of the power seat adjuster along various axes. For example, front and rear vertical drive motors, respectively, are mounted on the power seat adjuster and connected to conventional lead screws and drive blocks or nuts to independently elevate front and rear edges of the seat support frame members, respectively, and, thereby, to provide selective vertical adjustment of the front and rear edges of the vehicle seat. In addition, a seat back recliner drive motor drives a pair of rotatable drive shafts, each of which are coupled to individual lead screws. Each lead screw is connected by a drive link to one of the seat back pivot brackets mounted on opposite sides of the power seat adjuster to provide selective pivotal adjustment of the seat back with respect to the seat bottom of a vehicle seat mounted on the seat support frame members.

The power seat adjuster also includes a horizontal drive means formed of an electric motor which is fixedly mounted to one of the upper tracks of the power seat adjuster by a suitable bracket. A pair of bi-directionally rotatable drive shafts extend outward from a gear assembly or box integrally connected to the output shaft of the drive motor to a rotatable connection with a lead screw disposed in each of a pair of opposed track assemblies.

FIG. 1 depicts a portion of one of the two vehicle track assemblies found in a conventional vehicle seat adjuster. The track assembly includes a lower track 10 which is fixed by suitable mounting brackets in a stationary position on the vehicle floor. The lower track 10 includes a generally planar base 11 having a pair of upstanding side walls 12 on opposite sides thereof. The side walls 12 smoothly curve into and terminate in downwardly extending inner flanges 14. As shown in FIG. 1, the inner flanges 14 are spaced from the side walls 12 to define a slot therebetween which extends longitudinally along the lower track 10.

The upper track 16 may take any one of a number of different configurations. By way of example only, the upper track 16 is formed of a pair of vertically extending side walls 18, the lower ends of which curve outwardly and upwardly to form end flanges 20. The end flanges 20 are disposed in the slot formed between the inner flange 14 and the side walls 12 of the lower track 10.

A low friction slide member 21 is disposed between the facing surfaces of the flanges 20 of the upper track 16 and the side walls 12 and the inner flanges 14 of the lower track 10 to facilitate easy sliding movement of the upper track 16 relative to the stationarily fixed lower track 10.

Figure 2:
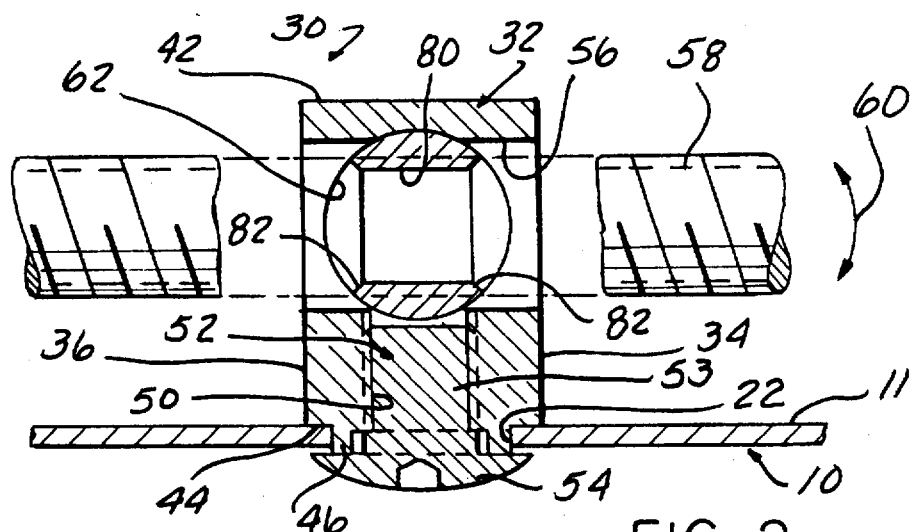
FIG. 2 is a cross sectional view generally taken along line 2—2 in FIG. 1.

As shown in FIG. 2, an aperture 22 is formed in the bottom base 11 of the lower track 10. A drive block denoted generally by reference number 30 is mounted in the aperture 22 in the lower track 10.

Figure 6:
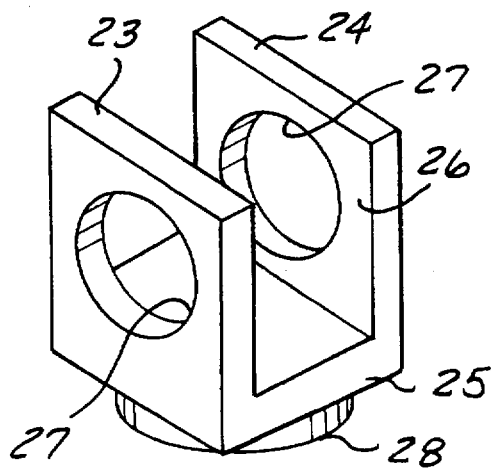
FIG. 6 is a perspective view of an alternate embodiment of a drive block according to the present invention.

As shown in FIGS. 1, 2, 3 and 5, the drive block 30 in the form of a generally cubical body 32. The body 32 has a four-sided configuration by way of example only. Alternately, other shapes may be provided for the body 32, such as a generally U-shaped configuration shown in FIG. 6 in which two spaced legs 23 and 24 project upwardly from a base 25. A first slot or aperture 26 is formed between the legs 23 and 24 and receives a rotatable shaft or lead screw therethrough. Apertures 27 formed in each of the legs 23 and 24 are aligned to accommodate a lead screw receiving insert as described hereafter. A mounting collar 28 projects from the base 25 for mounting the drive block in the lower track 10 as also described hereafter.

The body 32 may be formed of any suitable material, such as a high strength metal, i.e., a low carbon, cold rolled steel, or aluminum as well as other materials, such as a plastic, i.e., 6,6 nylon.

In the exemplary configuration shown in FIGS. 1, 2, 3 and 5, the body 32 of the drive block 30 has a generally square cross section formed with four side walls 34, 36, 38 and 40. The corners of the side walls 34, 36, 38 and 40 are chamfered as shown in FIG. 1 by example only. A top wall 42 is formed at one end of the side walls 34, 36, 38 and 40 and is spaced from an opposed bottom wall 44.

A mounting collar 46 projects from the bottom wall 44 and has an overall diameter less than the width of the body 32 between two opposed side walls 34 and 36 or 38 and 40. The mounting collar 46 is sized to fit within the aperture 22 in the lower track 10, as shown in FIG. 2, to rotatably position the drive block 30 in the lower track 10 for rotation about an axis extending longitudinally through the body 30 and perpendicular to the lower track 10 as shown by the arrow 48 in FIG. 1.

Figure 3:
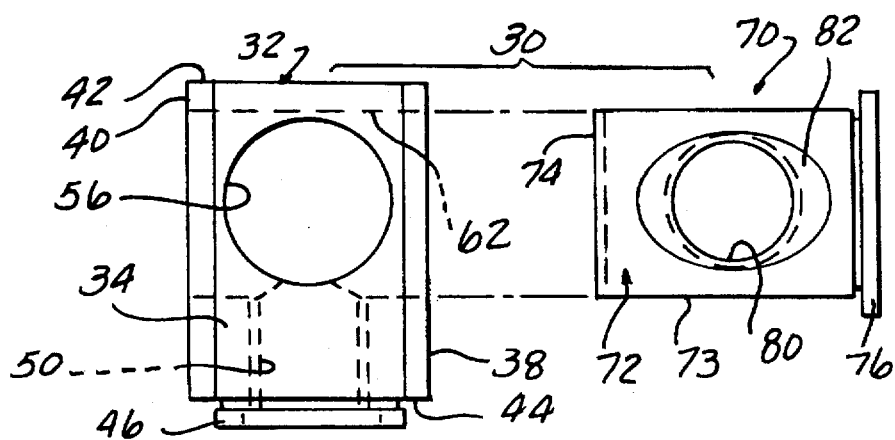
FIG. 3 is an exploded, side elevational view of the drive block and insert.

As shown in FIGS. 2 and 3, a bore 50 extends through the mounting collar 46 and the bottom portion of the body 32.

The bore 50 is threaded and receives a threaded fastener means 52, such as a threaded bolt shown in FIGS. 1 and 2. The fastener 52 has a threaded shank 53 and an enlarged head 54. The head 54 has a diameter greater than the diameter of the aperture 22 in the lower track 10. The length of the mounting collar 46, as shown in FIG. 2, is slightly greater than the thickness of the base 11 of the lower track 10. In this manner, the head 54 of the fastener 52 will seat against the outer surface of the mounting collar 46 and the base 11 of the lower track 10, as shown in FIG. 2. This provides a small gap between the bottom wall 44 of the drive block 30 and the base 11 of the lower track 10 to enable the drive block 30 to bi-directionally rotate about a longitudinal axis in the direction of arrow 48 shown in FIG. 1 while still substantially axially fixing the drive block 30 relative to the lower track 10.

A first rotatable shaft or lead screw receiving bore 56 is formed in the body 32 extending between the side walls 34 and 36. The bore 56 has an inner diameter greater than the maximum outer diameter of the rotatable shaft or lead screw 58. This allows pivotal movement of the lead screw 58 in the direction of arrow 60 as shown in FIG. 2 and described in greater detail hereafter. The difference between the diameters of the bore 56 and the lead screw 58 is such that the lead screw 58 is capable of pivotal movement of between about 3° to 6° about an axis extending transverse to the bore 56.

A second bore 62 is also formed in the body 32 transverse to and intersecting the first bore 56. The axes of the bores 56 and 62 intersect each other and form a common plane. The second bore 62 extends through the body 32 between the side walls 38 and 40 as shown in FIGS. 1 and 3. The second bore 62 has a diameter larger than the diameter of the first bore 56.

As shown in FIG. 1, and in greater detail in FIGS. 2–5, an insert 70 is rotatably mounted in the bore 62 in the body 32 of the drive block 30. The insert 70 is in the form of a tubular body 72 formed of a tubular portion or sleeve 73 having a substantially circular cross section extending from a first end 74 to a second end 76 which is in the form of an enlarged diameter end flange having a greater diameter than the outer diameter of the tubular sleeve 73 of the body 72.

The insert 70 may be formed of any suitable material, such as a high strength steel or other metal. Alternately, a suitable high strength plastic, such as 6,6 nylon, may also be used to form the insert 70 for use with either a metallic or plastic body 32 of the drive block 30.

The outer diameter of the tubular portion 73 of the body 72 of the insert 70 is sized to closely fit within the bore 62 in the body 32 to securely retain the insert 70 in the body 32 while still allowing rotation and transverse movement of the insert 70 within the bore 62 as described hereafter.

Figure 4:
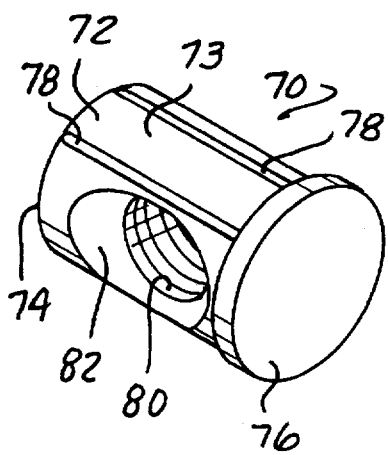
FIG. 4 is a perspective view of the insert shown in FIG. 3.

As shown in FIG. 4, a plurality of shave ribs or beads 78 may be optionally formed on the exterior of the tubular portion of the body 72 extending between the first and second ends 74 and 76 when the tubular body 72 is formed of a plastic material. The shave ribs 78 may be provided in any number, such as four shave ribs 78 spaced 90° apart about the circumference of the tubular portion 73. The shave ribs 78 deform when the insert 70 is forcibly inserted into the bore 62 to securely engage the insert 70 with the inner surfaces of the bore 62 in the body 32 while still enabling rotation of the insert 70 about a longitudinal axis extending between the first and second ends 74 and 76 thereof and/or lateral movement of the insert 70 in the bore 62.

As shown in FIG. 3, the first end 74 of the body 72 has a small recess which forms a raised peripheral lip. After the body 72 is inserted into the bore 62 in the drive block 30, the body 72 is placed in a die and an anvil with a radiussed end is brought into forced engagement with the first end 74 of the body 72. The anvil forces or deforms the lip on the first end 74 radially outward to form an enlarged lip or flange 75 as shown in FIG. 5. The length of the body 72 between the inner faces of the flange 75 at the first end 74 and the flange 76 at the second end 76 is greater than the length of the body 32 between sidewalls 34 and 38 to enable a small amount of movement of the body 72 within the body 32 while retaining the body 72 in the body 32 and preventing the lead screw 58 from contacting the inner surfaces of the bore 56 in the body 32.

A transverse bore 80 is formed in the tubular sleeve 73 of the tubular body 72 of the insert 70 as shown in FIGS. 2–5. The bore 70 is threaded to engage the threads on the rotatable shaft or lead screw 58. Further, the opposed ends of the bore 80 are flared outwardly from the inner diameter of the bore 80 to form conical surfaces 82.

The threaded bore 80 enables the lead screw 58 to rotate within the insert 70. However, the insert 70 is coupled to the body 32 of the drive nut 30 to provide bi-directional linear movement of the lead screw 58 relative to the drive block 30 and the lower track 10 in a conventional manner.

The above-defined structure of the drive block provides multiple axes and/or directions of movement of the drive block 30 relative to the lower track 10 and the lead screw 58 which enables the drive block 30 to accommodate different positional arrangements of the rotatable shaft or lead screw 58 relative to the lower track 10. As described above, the rotatable mounting of the drive block 30 in the aperture 22 of the lower track 10 enables the drive block 30 to rotate about a longitudinal axis extending between the top wall 42 and the bottom wall 44 of the drive block 30 in the direction of arrow 48 shown in FIG. 1 to accommodate any lateral end-to-end offset between the longitudinal axes of the lead screw 58 and the lower track 10. At the same time, the insert 70 is capable of rotation within the bore 62 in the body 32 of the drive block 30 about a longitudinal axis extending between the first and second ends 74 and 76 thereof to accommodate any non-parallel positions between the longitudinal axes of the lead screw 58 and the lower track 10 since the insert 70 can rotate within the body 32 of the drive block 30 in the direction of arrow 60, shown in FIG. 2.

Further, as shown more clearly in FIG. 5, since the diameter of the first bore 56 in the body 32 of the drive block is greater than the diameter of the bore 80 in the insert 70, and, further, since the length of the sleeve 73 between the inner faces of the end flanges 75 and 76 is greater than the width of the drive block 30, the insert 70 is capable of lateral movement between the side walls 38 and 40 of the body 32 of the drive block 30 to accommodate any lateral offset of the longitudinal axis of the lead screw 58 relative to the longitudinal axis of the drive block 30 and the lower track 10.

The above-described axes of movement in the present drive block enable the drive block to accommodate any positional arrangement of the lead screw 58 relative to the lower track 10. This overcomes any dimensional or tolerance problems encountered in the manufacture and assembly of a seat adjuster and enables the lead screw 58 to rotate at the desired low speed with high torque without objectionable noise, binding or wear.

What is claimed is:

1. A drive apparatus comprising:

first and second members, the first member movable relative to the second member;

a threaded shaft carried with the first member;

means, coupled to the threaded shaft, for imparting rotation to the shaft;

a drive block carried with the second member; and means, co-acting with the second member, the drive block and the threaded shaft, for allowing pivotal movement of the threaded shaft relative to the second member about two perpendicular axes, each of the two axes disposed mutually exclusively perpendicular to an axis of rotation of the threaded shaft, the co-acting means including:

a first bore extending through the drive block and receiving the threaded shaft therethrough, the first bore having an inner diameter greater than a maximum outer diameter of the threaded shaft;

a body carried by the drive block transversely to and intersecting the first bore in the drive block, the body being rotatable with respect to the drive block about a first axis perpendicular to an axis through the first bore;

a threaded second bore formed in the body perpendicular to the first bore and threadingly engaging the threaded shaft for causing linear movement of the threaded shaft and the first member relative to the drive block and the second member as the threaded shaft rotates;

the first bore having a diameter larger than a diameter of the second bore to permit lateral adjustment of the body with respect to the first bore in the drive block while retaining the first and second bores in communication; and means, carried with the drive block and formed in the second member, for substantially axially fixedly mounting the drive block to the second member and for allowing rotation of the drive block about a second longitudinal axis extending through the drive block substantially perpendicular to the second member.

2. The drive apparatus of claim 1 wherein the coacting means comprises:

an aperture formed in the second member; and a mounting collar formed on the drive block and mountable through the aperture in the second member.

3. The drive apparatus of claim 2 further comprising:

fastening means, engagable with the drive block, for coupling the drive block to the second member.

4. The drive apparatus of claim 1 wherein the first and second members comprise:

lower and upper tracks of a vehicle seat adjuster track assembly;

the threaded shaft interposed between the lower and upper tracks;

the drive block mounted in the lower track; and means for carrying the threaded shaft on the upper track for co-extensive linear movement of the upper track and the threaded shaft upon rotation of the threaded shaft through the drive block mounted in the lower track.

5. The drive apparatus of claim 1 wherein the co-acting means allows pivotal movement of the threaded shaft relative to the second member over at least a limited angular extent about the first axis and over a substantially large angular extent about the second axis.

6. A drive apparatus comprising:

first and second members, the first member movable relative to the second member;

a threaded shaft carried with the first member;

means, coupled to the threaded shaft, for imparting rotation to the shaft;

a drive block carried with the second member; and means, coacting with the drive block and the threaded shaft, for allowing pivotal movement of the threaded shaft relative to the drive block about two perpendicular axes, each of the two axes disposed mutually exclusively perpendicular to an axis of rotation of the threaded shaft, the coacting means including:

means, carried with the drive block and formed in the second member, for substantially axially fixedly mounting the drive block to the second member and for allowing rotation of the drive block about a longitudinal axis extending through the drive block substantially perpendicular to the second member, the fixedly mounting means including:

an aperture formed in the second member; and a mounting collar formed on the drive block and mountable through the aperture in the second member; the aperture in the second member and the mounting collar each have a circular cross section, with a diameter of the aperture being larger than an outer diameter of the mounting collar.

7. A drive apparatus comprising:

first and second members, the first member movable relative to the second member;

a threaded shaft carried with the first member;

means, coupled to the threaded shaft, for imparting rotation to the shaft;

a drive block carried with the second member; and means, coacting with the drive block and the threaded shaft, for allowing pivotal movement of the threaded shaft relative to the drive block about two perpendicular axes, each of the two axes disposed mutually exclusively perpendicular to an axis of rotation of the threaded shaft, the coacting means including:

means, carried with the drive block and formed in the second member, for substantially axially fixedly mounting the drive block to the second member and for allowing rotation of the drive block about a longitudinal axis extending through the drive block substantially perpendicular to the second member, the fixedly mounting means including:

an aperture formed in the second member; and a mounting collar formed on the drive block and mountable through the aperture on the second member; fastening means, engagable with the drive block, for coupling the drive block to the second member;

the mounting collar on the drive block has a greater thickness than a thickness of the second member to enable movement of the drive block with respect to the second member when the drive block is coupled to the second member by the fastening means.

8. The drive apparatus of claim 7 further comprising:

a threaded bore extending axially through the mounting collar of the drive block, the fastening means threadingly engagable with the threaded bore.

9. The drive apparatus of claim 8 wherein the fastener means comprises:

a threaded shank; and an enlarged head formed at one end of the threaded shank;

the enlarged head engaging the mounting collar on the drive block and the second member when the shank is threaded into the threaded bore in the mounting collar to space the drive block from the second member so as to enable rotation of the drive block with respect to the second member about an axis extending through the mounting collar and the drive block.

10. A drive apparatus comprising:

a first and second members, the first member movable relative to the second member;

a threaded shaft carried with the first member means coupled to the threaded shaft, for imparting rotation to the shaft;

a drive block carried with the second member; and means, coacting with the drive block and the threaded shaft, for allowing pivotal movement of the threaded shaft relative to the drive block about first and second perpendicular axes, each of the first and second axes disposed mutually exclusively perpendicular to each other to an axis of rotation of the threaded shaft, the coacting means including:

first aperture means, formed in the drive block, for receiving the threaded shaft therethrough;

a body carried by the drive block transversly to and intersecting the first aperture means in the drive block, the body being rotatable with respect to the drive block about an axis perpendicular to an axis through the first aperture means; and a threaded second bore formed in the body perpendicular to the first aperture means and threadingly engaging the threaded shaft.

11. The drive apparatus of claim 10 further comprising:

third aperture means formed in the drive block perpendicular to and intersecting the first aperture means, the body mounted in the third aperture means.

12. The drive apparatus of claim 11 wherein the body comprises:

a tubular sleeve having opposed first and second ends;

an enlarged end flange formed at the second end, the enlarged end flange having a diameter greater than a diameter of a tubular portion of the tubular sleeve;

an enlarged end flange is formed at the first end of the tubular sleeve;

diameters of both of the end flanges at the first and second ends of the tubular sleeve being greater than a diameter of the third aperture means to retain the body in the drive block.

13. The drive apparatus of claim 12 wherein:

the length of the tubular sleeve between the end flanges at the first and second ends of the body is greater than a total length of the drive block along the third aperture means.

14. The drive apparatus of claim 10 wherein:

the body is formed of a plastic material;

at least one deformable rib formed exteriorly on the body, a maximum outer diameter of the body and the at least one deformable rib being greater than the inner diameter of the third bore in the drive block such that the at least one deformable rib is deformed as the body is mounted in the third aperture means to firmly and movably mount the body in the third aperture means of the drive block.

15. The drive apparatus of claim 10 wherein:

conical inward extending surfaces are formed between the ends of the second bore and outer surfaces of the body.

16. The drive apparatus of claim 10 wherein the body comprises:

a tubular sleeve having opposed first and second ends; and an enlarged end flange formed at the second end, the enlarged end flange having a diameter greater than a diameter of a tubular portion of the tubular sleeve.

17. A drive apparatus comprising:

first and second members, the first member movable relative to the second member;

a threaded shaft carried with the first member;

means, coupled to the threaded shaft, for imparting rotation to the shaft;

a drive block carried with the second member; and means, coacting with the drive block and the threaded shaft, for allowing pivotal movement of the threaded shaft relative to the drive block about two perpendicular axes, each of the two axes disposed mutually exclusively perpendicular to an axis of rotation of the threaded shaft, the coacting means including:

means, carried in the drive block and threadingly engaging the threaded shaft, for causing linear movement of the threaded shaft and the first member relative to the drive block and the second member as the threaded shaft is rotated;

the means for causing linear movement rotatable about a first axis perpendicular to an axis of rotation of the threaded shaft; and means, carried on the drive block and formed in the second member, for substantially axially fixedly mounting the drive block to the second member and for allowing rotation of the drive block about a longitudinal axis extending between opposed ends of the drive block, the fixedly mounting means including:

an aperture formed in the second member, a mounting collar formed on the drive block and mountable through the aperture in the second member;

the aperture in the second member and the mounting collar each have a circular cross section, with a diameter of the aperture being larger than an outer diameter of the mounting collar;

fastening means, engagable with the drive block, for coupling the drive block to the second member; a threaded bore extending axially through the mounting collar of the drive block, the fastening means threadingly engagable with the threaded bore; and the mounting collar on the drive block has a greater thickness than a thickness of the second member to enable movement of the drive block with respect to the second member when the drive block is coupled to the second member by the fastening means.

18. A drive apparatus comprising:

first and second members, the first member movable relative to the second member;

a threaded shaft carried with the first member;

means, coupled to the threaded shaft, for imparting rotation to the shaft;

a drive block carried with the second member; and means, coacting with the drive block and the threaded shaft, for allowing pivotal movement of the threaded shaft relative to the drive block about two perpendicular axes, each of the two axes disposed mutually exclusively perpendicular to an axis of rotation of the threaded shaft, the coacting means including:

a first bore extending through the drive block and having an inner diameter greater than a maximum outer diameter of the threaded shaft;

a body carried by the drive block transversely to and intersecting the first bore in the drive block, the body being rotatable with respect to the drive block about an axis perpendicular to an axis of the first bore; and a threaded second bore formed in the body disposed perpendicular to the first bore and threadingly engaging the threaded shaft.

19. The drive apparatus of claim 18 wherein the coacting means further comprises:

a third bore formed in the drive block perpendicular to and intersecting the first bore, the body rotatably mounted in the third bore.

20. A power seat adjuster comprising:

a lower track;

an upper track movably mounted with respect to the lower track;

a threaded lead screw;

drive means coupled to the lead screw for rotating the lead screw;

a drive block carried with the lower track; and co-acting means, co-acting with the drive block, for allowing pivotal movement of the threaded shaft relative to the drive block about two perpendicular axes, each of the two axes disposed mutually exclusively perpendicular to an axis of rotation of the threaded shaft;

the co-acting means including:

means, carried in the drive block and threadingly engaging the threaded shaft, for causing linear movement of the threaded shaft and the upper track relative to the drive block and the lower track as the threaded shaft is rotated;

the means for causing linear movement rotatable about a first axis perpendicular to an axis of rotation of the threaded shaft; and means, carried on the drive block and formed in the lower track, for substantially axially fixedly mounting the drive block to the lower track and for allowing rotation of the drive block about a longitudinal axis extending between opposed ends of the drive block, the fixedly mounting means including:

an aperture formed in the lower track, a mounting collar formed on the drive block and mountable through the aperture in the lower track;

the aperture in the lower track and the mounting collar each have a circular cross section, with a diameter of the aperture being larger than an outer diameter of the mounting collar;

fastening means, engagable with the drive block, for coupling the drive block to the lower track; a threaded bore extending axially through the mounting collar of the drive block, the fastening means threadingly engagable with the threaded bore; and the mounting collar on the drive block has a greater thickness than a thickness of the lower member to enable movement of the drive block with respect to the lower member when the drive block is coupled to the lower member by the fastening means.

21. A power seat adjuster comprising:

a lower track;

an upper track movably mounted with respect to the lower track;

a threaded lead screw;

drive means coupled to the lead screw for rotating the lead screw;

a drive block;

co-acting means, co-acting with the drive block, for allowing pivotal movement of the threaded shaft relative to the drive block about two perpendicular axes, each of the two axes disposed mutually exclusively perpendicular to an axis of rotation of the threaded shaft, the co-acting means including:
- a first bore extending through the drive block and having an inner diameter greater than a maximum outer diameter of the threaded shaft;
- a body carried by the drive block transversely to and intersecting the first bore in the drive block, the body being rotatable with respect to the drive block about a first axis perpendicular to an axis of the first bore;
- a threaded second bore formed in the body disposed perpendicular to the first bore and threadingly engaging the threaded lead screw for linear movement of the threaded lead screw and the upper track relative to the drive block and the lower track as the threaded lead screw is rotated; and
- means, carried on the drive block and formed in the lower track, for substantially axially fixedly mounting the drive block to the lower track and for allowing rotation of the drive block about a longitudinal axis extending between opposed ends of the drive block.

22. The drive apparatus of claim 21 wherein the coacting means further comprises:

a third bore formed in the drive block perpendicular to and intersecting the first bore, the body rotatably mounted in the third bore.

* * * * *